United States Patent
Fanning et al.

(10) Patent No.: US 9,424,008 B2
(45) Date of Patent: *Aug. 23, 2016

(54) API DESCRIPTIONS

(71) Applicant: Microsoft Technology Licensing, LLC, Redmond, WA (US)

(72) Inventors: Michael C. Fanning, Redmond, WA (US); Ani Babaian, Bothell, WA (US); Jomo A. Fisher, Redmond, WA (US); Anson M. Horton, Kirkland, WA (US); Lucas J. Hoban, Seattle, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/663,753

(22) Filed: Mar. 20, 2015

(65) Prior Publication Data
US 2015/0193214 A1     Jul. 9, 2015

Related U.S. Application Data

(63) Continuation of application No. 13/085,944, filed on Apr. 13, 2011, now Pat. No. 8,997,069.

(51) Int. Cl.
*G06F 9/45* (2006.01)
*G06F 9/54* (2006.01)

(52) U.S. Cl.
CPC *G06F 8/427* (2013.01); *G06F 8/43* (2013.01); *G06F 9/54* (2013.01)

(58) Field of Classification Search
None
See application file for complete search history.

(56) References Cited

U.S. PATENT DOCUMENTS

| | | | |
|---|---|---|---|
| 6,546,397 B1 | 4/2003 | Rempell | |
| 6,951,014 B1 | 9/2005 | Sokolov | |
| 7,340,747 B1 * | 3/2008 | Zeliger | G06F 9/465 709/203 |
| 7,945,902 B1 | 5/2011 | Sahoo | |
| 8,387,020 B1 * | 2/2013 | MacLachlan | G06F 11/3604 717/124 |
| 8,918,772 B1 * | 12/2014 | MacLachlan | G06F 11/3604 717/141 |
| 8,997,069 B2 | 3/2015 | Fanning et al. | |
| 2004/0031015 A1 * | 2/2004 | Ben-Romdhane | G06F 8/75 717/107 |
| 2006/0117257 A1 | 6/2006 | Hasson et al. | |
| 2006/0179430 A1 * | 8/2006 | Besbris | G06F 9/445 717/162 |
| 2007/0044080 A1 * | 2/2007 | Vick | G06F 9/4428 717/143 |
| 2008/0172382 A1 * | 7/2008 | Prettejohn | H04L 63/126 |
| 2008/0282238 A1 | 11/2008 | Meijer et al. | |
| 2008/0320444 A1 * | 12/2008 | Meijer | G06F 8/437 717/110 |
| 2009/0222799 A1 * | 9/2009 | Stewart | G06F 8/72 717/143 |
| 2009/0265692 A1 | 10/2009 | Godefroid et al. | |

(Continued)

OTHER PUBLICATIONS

"Browser Detection and Cross Browser Support", Retrieved from: <https://developer.mozilla.org/en/browser_detection_and_cross_browser_support> on Feb. 22, 2011, Oct. 9, 2009, 19 pages.

(Continued)

*Primary Examiner* — Daxin Wu
(74) *Attorney, Agent, or Firm* — Tim Churna; Kate Drakos; Micky Minhas

(57) ABSTRACT

API description techniques are described for consumption by dynamically-typed languages. In one or more implementations, machine-readable data is parsed to locate descriptions of one or more application programming interfaces (APIs). The descriptions of the one or more application programming interfaces are projected into an alternate form that is different than a form of the machine-readable data.

20 Claims, 5 Drawing Sheets

(56) References Cited

U.S. PATENT DOCUMENTS

| | | | | |
|---|---|---|---|---|
| 2011/0078674 | A1 | 3/2011 | Ershov | |
| 2011/0179402 | A1* | 7/2011 | Buckley | G06F 8/43 717/140 |
| 2011/0307869 | A1* | 12/2011 | Cwalina | G06F 8/447 717/127 |
| 2012/0266141 | A1 | 10/2012 | Fanning et al. | |

OTHER PUBLICATIONS

"Ext JS Cross-Browser Rich Internet Application Framework", Retrieved from: <http://www.sencha.com/products/extjs/> on Feb. 22, 2011, 2 pages.

"Final Office Action", U.S. Appl. No. 13/085,944, Aug. 15, 2014, 21 pages.

"Final Office Action", U.S. Appl. No. 13/085,944, Jan. 10, 2014, 21 pages.

"List of Really Useful Free Tools for Javascript Developers", Retrieved from: <http://www.w3avenue.com/2009/05/19/list-of-really-useful-free-tools-for-javascript-developers/> on Feb. 22, 2011,May 19, 2009, 8 pages.

"Non-Final Office Action", U.S. Appl. No. 13/085,944, May 22, 2014, 21 pages.

"Non-Final Office Action", U.S. Appl. No. 13/085,944, Sep. 27, 2013, 19 pages.

"Notice of Allowance", U.S. Appl. No. 13/085,944, Nov. 21, 2014, 9 pages.

"Object Detection", Retrieved from <http://www.webreference.com/js/column6/object.html> on Feb. 22, 2011,Dec. 4, 1997, 3 pages.

"Safely Accessing Content DOM from Chrome", Retrieved from: <https://developer.mozilla.org/en/Safely_accessing_content_DOM_from_chrome> on Feb. 22, 2011,Jan. 11, 2011, 5 pages.

"Write Browser-Independent Scripts", Retrieved from: <http://www.intranetjournal.com/faqs/jsfaq/how9.html> on Feb. 22, 2011, 2 pages.

* cited by examiner

400 —

402
Generate descriptions of one or more application programming interfaces (APIs) from machine-readable data without executing the machine-readable data, the generated descriptions consumable by a dynamically-typed language

404
Provide one or more features, through consumption of the generated description by the dynamically-typed language, to verify machine-executable code using the generated description of the one or more application programming interfaces

406
At least one feature is configured to dynamically generate a static view of the one or more application programming interfaces (APIs) that are available on a current configuration of a computing device

408
At least one feature is an editor completion list

410
At least one feature is executable to verify that call sites of the machine-executable code are configured to call an application programming interface (API) referenced in the generated description

412
At least one feature is executable to verify syntax of the machine-executable code based at least in part on the generated description

*Fig. 4*

API DESCRIPTIONS

RELATED APPLICATIONS

This Application claims priority under 35 U.S.C. Section 120 as a continuation of U.S. patent application Ser. No. 13/085,944, filed Apr. 13, 2011, and titled "API Descriptions," the entire disclosure of which is hereby incorporated by reference.

BACKGROUND

The complexity of executable code (e.g., applications) is ever increasing as the amount of functionality that is provided via the executable code increases. For example, executable code may include hundreds of thousands to even millions of lines of code, such as in an operating system. Additionally, the complexity of the executable code may be further magnified when one collection of code is configured to interact with another collection.

An application, for instance, may be configured to interact with an operating system. Further, as newer versions of the application and/or operating system are developed, the application programming interfaces utilized by these collections of code may change. This may further complicate continued development of each collection of executable code, which may lead to frustration on the part of developers.

SUMMARY

API description techniques are described for consumption by dynamically-typed languages. In one or more implementations, machine-readable data is parsed to locate descriptions of one or more application programming interfaces (APIs). The descriptions of the one or more application programming interfaces are projected into an alternate form that is different than a form of the machine-readable data.

In one or more implementations, descriptions are generated of one or more application programming interfaces (APIs) from machine-readable data without executing the machine-readable data, the generated descriptions consumable by a dynamically-typed language. One or more features are provided, through consumption of the generated description by the dynamically-typed language, to verify machine-executable code using the generated description of the one or more application programming interfaces.

In one or more implementations, a first collection of executable machine-readable code is parsed to locate descriptions of one or more application programming interfaces (APIs) included in the code. The descriptions of the one or more application programming interfaces are projected into an abstract syntax tree or executable code in compliance with a dynamically-typed language. The projected descriptions are then employed to check for compatibility of a second collection of executable machine-readable code with the first collection of executable machine-readable code.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 4 is a flow diagram depicting a procedure in an example implementation in which features are provided through consumption of a generated description by a dynamically-typed language.

DETAILED DESCRIPTION

Overview

The complexity of executable code is ever increasing. This is especially true in the development of executable code that leverages dynamically-typed languages in the development of the code. For example, tool support for dynamically-typed languages (e.g. JavaScript, which is a trademark of Oracle Corporation, Redwood Shores, Calif.) may be complicated by the dynamic nature of the executable code and the lack of metadata and discoverability of features. As a result, it may be difficult to determine what callable application programming interfaces (APIs) exist within the executable code that is written for a dynamically-typed language without actually executing it. Accordingly, the dynamic nature of dynamically-typed languages may make it difficult to check for compatibilities, verify that identifiers resolve to callable constructs, and so on, especially when compared with static-typed languages that utilize a compiler.

API descriptions for consumption by dynamically-typed languages are described. In one or more implementations, metadata is processed into a form that is consumable by a dynamically-typed language, such as to support code-editing tools, static checkers, and so on. For instance, a module may be employed to convert data describing arbitrary callable APIs into facades. The facades may be expressed in a form (e.g., abstract syntax tree, executable code, and so on) that is consumable by tools such as code editors and static checkers.

For example, the module may acquire a representation of code that is directly or indirectly consumed by a dynamically-typed language. The module may apply one or more transformations (e.g., employ normalization logic) and convert that information into a form that is consumable by a dynamically-typed language, such as code in compliance with the dynamically-typed language, an abstract syntax tree, and so forth. This information may be persisted and/or passed directly to tools such as code editors and static checkers in order to diagnose problems identify calls to a non-existent API, provide completion lists that display callable APIs, and so forth. Further discussion of these techniques may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
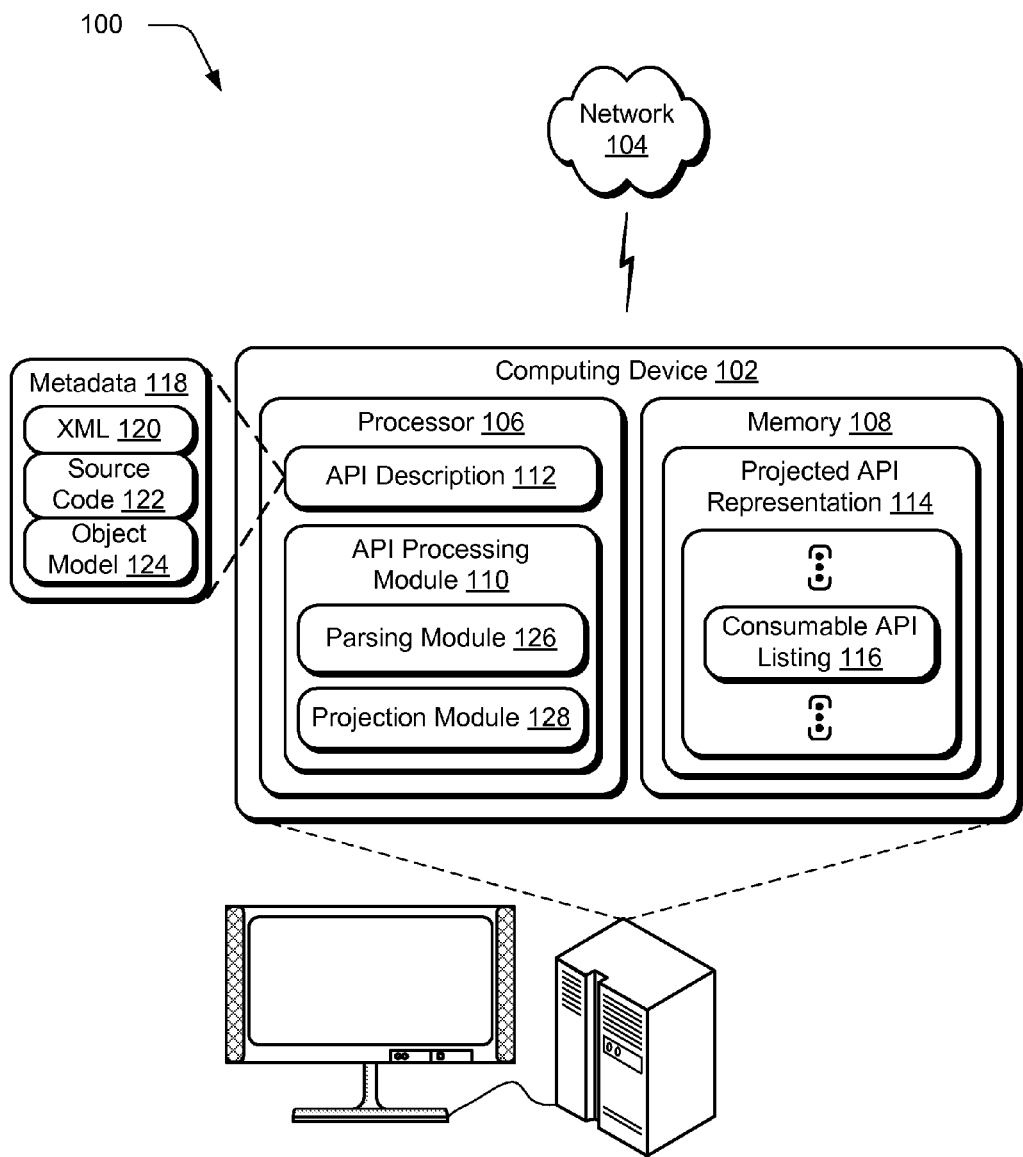
FIG. 1 is an illustration of an environment in an example implementation that is operable to employ techniques described herein that relate to API descriptions

FIG. 1 is an illustration of an environment 100 in an example implementation that is operable to employ techniques described herein that relate to API descriptions. The illustrated environment 100 includes a computing device 102, which may be configured in a variety of ways. For example, the computing device 102 may be configured as a computer that is capable of communicating over a network 104, such as a desktop computer, a mobile station, an entertainment appliance, a set-top box communicatively coupled to a display device, a wireless phone, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations, a remote control and set-top box combination, an image capture device and a game console configured to capture gestures, and so on.

The computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via the network 104. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Although the network 104 is illustrated as the Internet, the network may assume a wide variety of configurations. For example, the network 104 may include a wide area network (WAN), a local area network (LAN), a wireless network, a public telephone network, an intranet, and so on. Further, although a single network 104 is shown, the network 104 may be configured to include multiple networks.

The computing device 102 is further illustrated as including a processor 106 and memory 108. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single processor 106 and memory 108 is shown, a wide variety of types and combinations may be employed. For example, memory 108 may be representative of random access memory (RAM), hard disk memory, removable medium memory, and other types of computer-readable media.

The computing device 102 is further illustrated as executing an API processing module 110, which is also storage in memory. The API processing module 110 is representative of functionality of the computing device 102 to process an API description 112 into a projected API representation 114. The projected API representation 114, for instance, may include a consumable API listing 116 that is compatible with a dynamically-typed language. This processing may be performed in a variety of ways.

The API processing module 110, for instance, may obtain the API description 112, such as locally at the computing device 102 and/or remotely via the network 104. The API description 112 is representative of machine-readable data (e.g., readable by the computing device 102) that describes one or more APIs and may include a variety of other data. Accordingly, the API description 112 may be configured as a variety of different metadata 118, such as metadata 118 arranged according to an XML 120 file, as source code 122 (e.g., JavaScript, C#, or other languages), described using an object module 124, and so on such as object code, a database, a binary format that describes type and API metadata, a COM library, API metadata that is encapsulated within a binary. The source code 122, for instance, may be configured as collection of code that is executable by the computing device 102, such as an operating system, browser, and so forth.

The API processing module 110 may then process the API description 112. As illustrated, for instance, the API processing module 110 may include a parsing module 126 and a projection module 126. The parsing module 126 is representative of functionality to parse the API description 112 to locate data that describes APIs. The projection module 128 is representative of functionality to project the parsed API description 112 into a form that is consumable by a dynamically-typed language. This form is represented by the projected API representation 114 having a consumable API listing 116, which as previously stated may assume a variety of configurations such as executable code, an abstract syntax tree, and so on. This projected API representation 114 may be consumed in a variety of ways.

Thus, the API processing module 110 may be used to transform arbitrary machine-readable data into a common form that is consumable by executable tools, such as editor/static analysis tools. The projected API representation 114, for instance, may be expressed in a dynamic source language itself and/or into a syntax tree of that language.

Additionally, the projected API representation 114 may involve a direct transliteration of an API and/or may also "project" (e.g., shape) the API to reflect runtime callable conditions. For example, original machine-readable data for an API in a dynamic language may not be sufficient in some instances to understand what is callable at runtime from the dynamic language. Accordingly, in such an example the API processing module 110 may generate an inflection point to extrapolate and construct the final callable form. In some cases, for instance, the extrapolation may be based on an understanding of how the runtime interoperates with external code. For instance, the runtime may transform a numeric type to keep the type constrained to a value that is legal within a particular language.

Additionally, during this projection process the API processing module 110 may generate information relevant to correct usage of the API that might not be expressed directly in the dynamic language. In these cases, the API processing module 110 may construct annotations or code hints in an intermediate form (e.g., as code comments or as code constructs) that provide indirect information to parsers and/or a runtime if executed. For example, a comment may be added to a parameter noting that it is a string type, for a dynamically-typed language that defines a string primitive but does not provide a mechanism for declaring the type of a variable.

In another example, hints may be provided regarding API usage that are strictly related to the implementation of a called API. For instance, a valid call to an API may involve either a single argument or three, but not be able to provide a useful result when called with two. Thus, the API processing module 110 may be used to examine metadata that is describes API and examination of executable code that implements the API. Further, the API processing module 110 may provide a result that may be leveraged by a variety of different executable modules (e.g., tools) such as for verifiability and editor completion list contexts that may go beyond validating language correctness, the existence of an API, and API signatures.

Further, the API processing module 110 may operate in a variety of ways. For example, the API processing module 110 may perform the parsing and projection dynamically at runtime, such as during execution of one or more tools to base the projected API representation 114 on a configured operating system that hosts the tools, e.g., an editor, static checker, and so on. In another example, the API processing module may involve a system in which the projected API representation 114 is generated in one context and consumed in another.

A variety of other functionality may also be supported by the API processing module 110, such as to merge API views from several versions of executable code. For instance, the API processing module 110 may be used to support executable tools to permit, validate, and raise completion lists of APIs for particular versions of executable code, e.g., to address instances in which a first and third version of an API may be usable as written but raise an error upon encountering elements of the API that shipped in a second version. Further discussion of generation and consumption of a projected API representation may be found in relation to FIG. 2.

Generally, any of the functions described herein can be implemented using software, firmware, hardware (e.g., fixed logic circuitry), manual processing, or a combination of these implementations. The terms "module" and "functionality" as used herein generally represent hardware, software, firmware, or a combination thereof. In the case of a software implementation, the module, functionality, or logic represents instructions and hardware that performs operations specified by the hardware, e.g., one or more processors and/or functional blocks.

Figure 2:
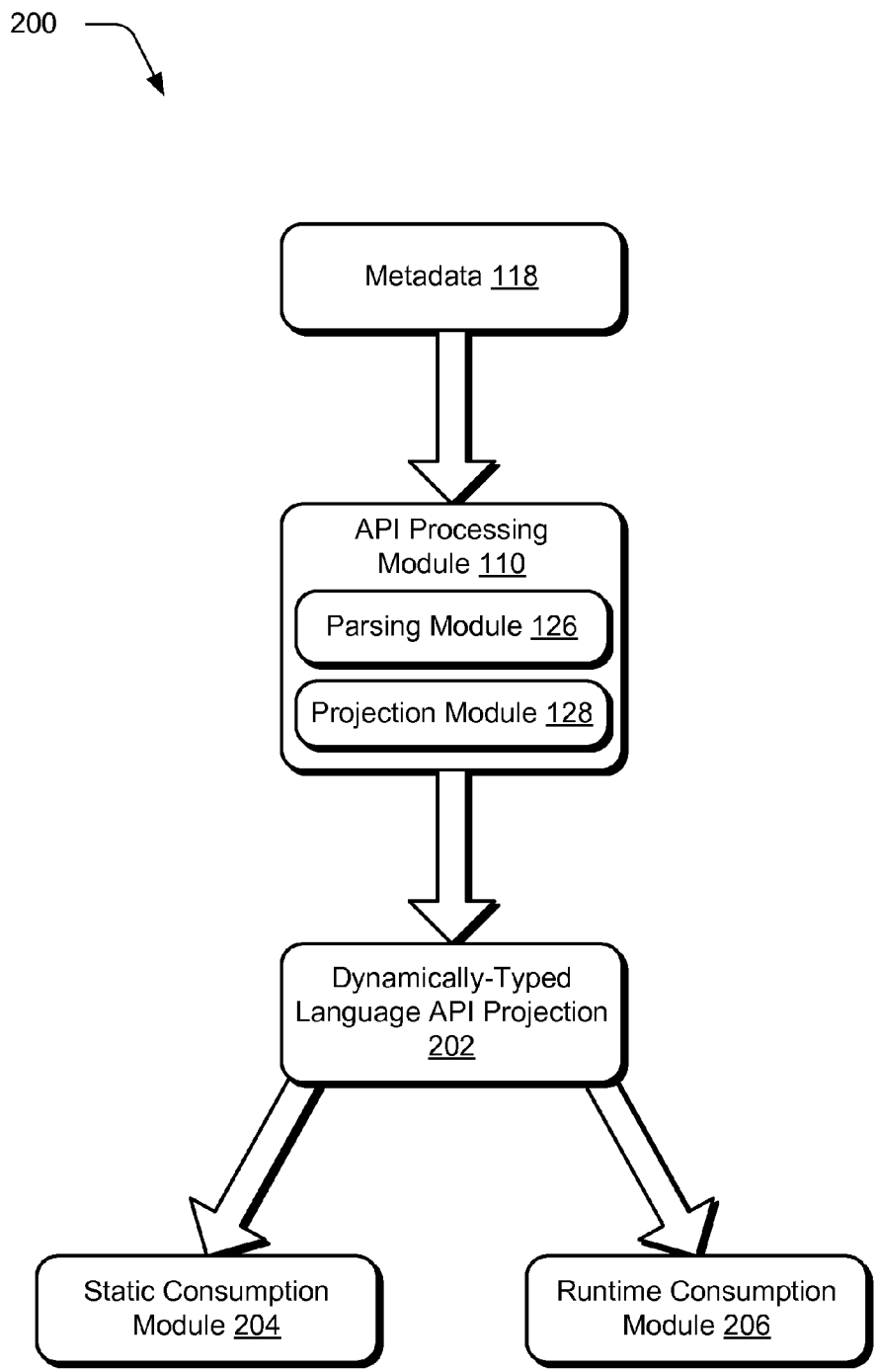
FIG. 2 is an illustration of a system in an example implementation showing formation and consumption of a projected API representation.

FIG. 2 is an illustration of a system 200 in an example implementation showing formation and consumption of a projected API representation 114. The system 200 in this example is configured to process metadata 118 by the API processing module 110. As a result of this processing, the API processing module 110 may form a dynamically-typed language API projection 202 for consumption by a static consumption module 204 and/or a runtime consumption module 206.

As previously described, the metadata 118 may take a variety of forms. For example, the metadata may be rendered in XML, as source code (e.g., JavaScript, C#, or other languages), in a metadata +code format such as Microsoft Intermediate Language (MSIL), a native type library (TLB), common intermediate language (CIL), program database (PDB), Windows Metadata (Windows is a trademark of Microsoft Corp, Redmond, Wash.) that describes operating system runtime API, acquired by instantiating and walking an object model configured for inspection, and so forth.

The API processing module 110 as illustrated includes a parsing module 126 and a projection module 128. The parsing module 126 represents a mechanism that is configured to acquire and parse an API description, which is illustrated as metadata 118.

The projection module 128 is representative of functionality that is responsible for projecting (e.g., shaping) the acquired API description into a form that can be consumed by a dynamically-typed language, e.g., JavaScript (which is a trademark of Oracle Corporation, Redwood Shores, Calif.). The projection module 128 may provide an output in a variety of formats, such as source code (e.g., according to a dynamically-typed language), abstract syntax tree, and so forth. Additionally, the processing by the projection module 128 may involve transforming the description of the API (e.g., normalizing) to make the API more readily understandable by a dynamically-typed language.

In one or more implementations, the body of the emitted methods may match an input implementation, be stripped entirely, perform some work in order to serve as an adapter to an alternate API, and so forth. For example, the transformation may be performed by a runtime of the dynamically-typed language to shape an API into a form that is better suited for consumption in the dynamically-typed language than in its native form. Example transformations include adapting numeric and date-time types to native equivalents, mapping an "eventing" model, and so on. The rewriting/shaping performed by the projection module 128, for instance, may be performed as an iterative process, e.g., an API representation may be projected into an abstract syntax tree. Subsequently, the abstract syntax tree may be reshaped (e.g., by visiting the tree and rewriting nodes/function bodies, and so on) and re-emitted to another format, such as source code in compliance with the dynamically-typed language. The dynamically-typed language API projection 202 output may then be persisted to storage, remain in memory 108 of the computing device 102, and so forth.

The dynamically-typed language API projection 202 may then be consumed in a variety of ways. For example, the dynamically-typed language API projection 202 may be consumed statically by a static consumption module 204. A variety of different static consumption techniques may be implemented by the static consumption module 204, such as by parsing the data or walking an abstract syntax tree.

Additionally, the static consumption module 204 may support a variety of features such as verifying that call sites of code under analysis map to the dynamically-typed language API projection 202, e.g., to an API that will be callable at runtime. In another example, the data may be used to generate completion lists for the editor language service. The completion list, for instance, may provide a list of available functions and/or parameters, and so on at arbitrary points within a file that is edited by a user via a user interface output by an editor module to program a language. Thus, the dynamically-typed language API projection 202 may be used by the static consumption module 204 to verify code against the projection.

The dynamically-typed language API projection 202 may also be consumed by a runtime consumption module 206. For instance, the projection may be executed by a runtime to provide features such as diagnostics, identify APIs to reflectively program a language, list names of APIs in an editor, and so on. In other instances, the projection may be used to verify that call sites map available APIs as described by the dynamically-typed language API projection 202. In other words, this verification may be performed to determine whether the called APIs actually exist. In yet another instance, completion lists may be formed for available functions and corresponding parameters, and so on again as the API is projected into a dynamically-typed language by a runtime. Further, the completion lists may be augmented with information that goes beyond a literal expressiveness of a dynamic language, such as a presumed type or a parameter.

In another example, these techniques may be leverage for use in conjunction with a browser. For example, these techniques may be used to make implicit document object model (DOM) API information explicit to users. A dynamically-typed language that has access to DOM API, for example, may vary between browser families and version. Accordingly, it may not be clear in source code whether use of a specific method will actually succeed at runtime due to browser differences and because there is no notion of compilation, type systems, and reference information in typical dynamically-typed languages such as JavaScript (which is a trademark of Oracle Corporation, Redwood Shores, Calif.). The techniques described herein, however, may be used to generate explicit descriptions of these API, render them in the dynamically-typed language, display that API to users, and so forth.

Thus, the techniques described above may be used to dynamically generate static views of one or more APIs that are available on a current machine configuration, for a specific browser or browser version and so forth without actual execution of the code that includes the API, which can result in undesired behaviors.

The techniques may also be used to provide features such as editor completion lists for APIs that are themselves dynamically constructed at runtime in order to interact with the operating system or other languages. Additionally, for scenarios and tooling that benefit from code execution, these techniques may be used to increase reliability, such as by generating bodiless methods that eliminate executable code (such as raising exceptions) that might cause problems or interfere with tool function. It should be readily apparent that although these features were listed separately as examples for either the static consumption module 204 or the runtime consumption module 206, in instances the features described above may be performed by either the static or runtime consumption modules 204, 206. Further, this description involved a few of a variety of different examples of consumption and thus a variety of other examples are also contemplated, such as semantic use of the checked code, satisfaction of one or more contracts that is defined by external executable code, checking a callback into an implementation of external executable code including existence of signatures involved for the callback, describes an API available over a network, an API made available via a remote code execution mechanism, an API that is available due to installation of a third-party component for use by an operating system, and so forth.

Example Procedures

The following discussion describes API description techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
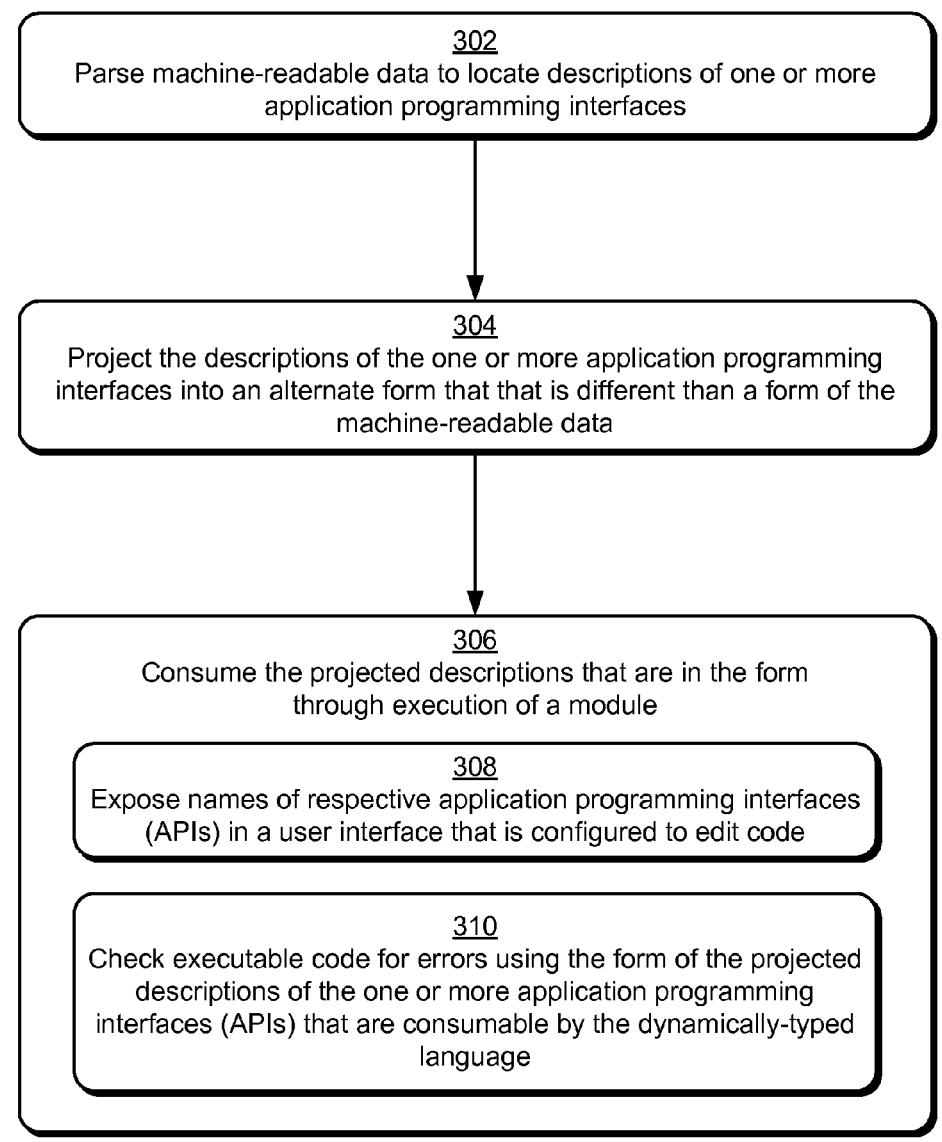
FIG. 3 is a flow diagram depicting a procedure in an example implementation in which descriptions of application programming interfaces are projected into a form that is consumable by a dynamically-typed language.

FIG. 3 depicts a procedure 300 in an example implementation in which descriptions of application programming interfaces are projected into an alternate form. Machine-readable data is parsed to locate descriptions of one or more application programming interfaces (block 302). As previously described, the machine-readable data may assume a variety of forms, such as metadata 118 that may be configured as source code, XML, metadata, and so forth.

The descriptions of the one or more application programming interfaces are projected into an alternate form that is different than a form of the machine-readable data (block 304). The parsing module 126 and the projection module 128 of the API processing module 110, for instance, may locate descriptions of APIs in the metadata 118 (e.g., binary descriptions, metadata, executable code, and so on) and project them into a form that is consumable by a dynamically-typed language such as JavaScript (which is a trademark of Oracle Corporation, Redwood Shores, Calif.) as well as other forms.

The projected descriptions that are in the alternate form are consumed through execution of a module (block 306). This consumption may take a variety of forms. For example, names of respective application programming interfaces (APIs) may be exposed in a user interface that is configured to edit code (block 308). This exposure, for instance, may include a list of available APIs that are selectable by a user of a code-editing tool, a completion list, provide auto-correction options, and so forth. In another example, executable code is checked for errors using the form of the projected descriptions of the one or more application programming interfaces (APIs) that are consumable by the dynamically-typed language (block 310). This checking, for instance, may be performed dynamically or statically to make sure executable code is written to use correct API names. Further discussion of features that may be used to check for errors may be found in relation to the following figure.

FIG. 4 depicts a procedure 400 in an example implementation in which features are provided through consumption of a generated description by a dynamically-typed language (block 404). Descriptions of one or more application programming interfaces (APIs) are generated from machine-readable data without executing the machine-readable data, the generated descriptions being consumable by a dynamically-typed language (block 402). As before, the machine-readable data may be configured in a variety of ways. Further, the generation in this example may be performed without executing the code, thereby avoiding unintended consequently of the execution of the code.

One or more features are provided, through consumption of the generated description by the dynamically-typed language to verify machine-executable code using the generated description of the one or more application programming interfaces (block 404). A variety of different features may be provided. For example, at least one of the features may be configured to dynamically generate a static view of the one or more application programming interfaces (APIs) that are available on a current configuration of a computing device (block 406). The static view, for instance, may be output in a user interface by a computing device 102 to show which APIs are available.

In another example, at least one of the features may be configured as an editor completion list (block 408), such as by an editor module configured to write and edit executable code. Further, at least one of the features may be executable to verify that call sites of the machine-executable code are configured to call an application programming interface (API) referenced in the generated description (block 410), which as before may be performed statically or dynamically. Yet further, at least one of the features may be executable to verify correctness and semantic use of the machine-executable code based at least in part on the generated description (block 412) and in this way may ensure that APIs are used correctly even if the name of the API is correct. A variety of other examples are also contemplated without departing from the spirit and scope thereof.

Figure 5:
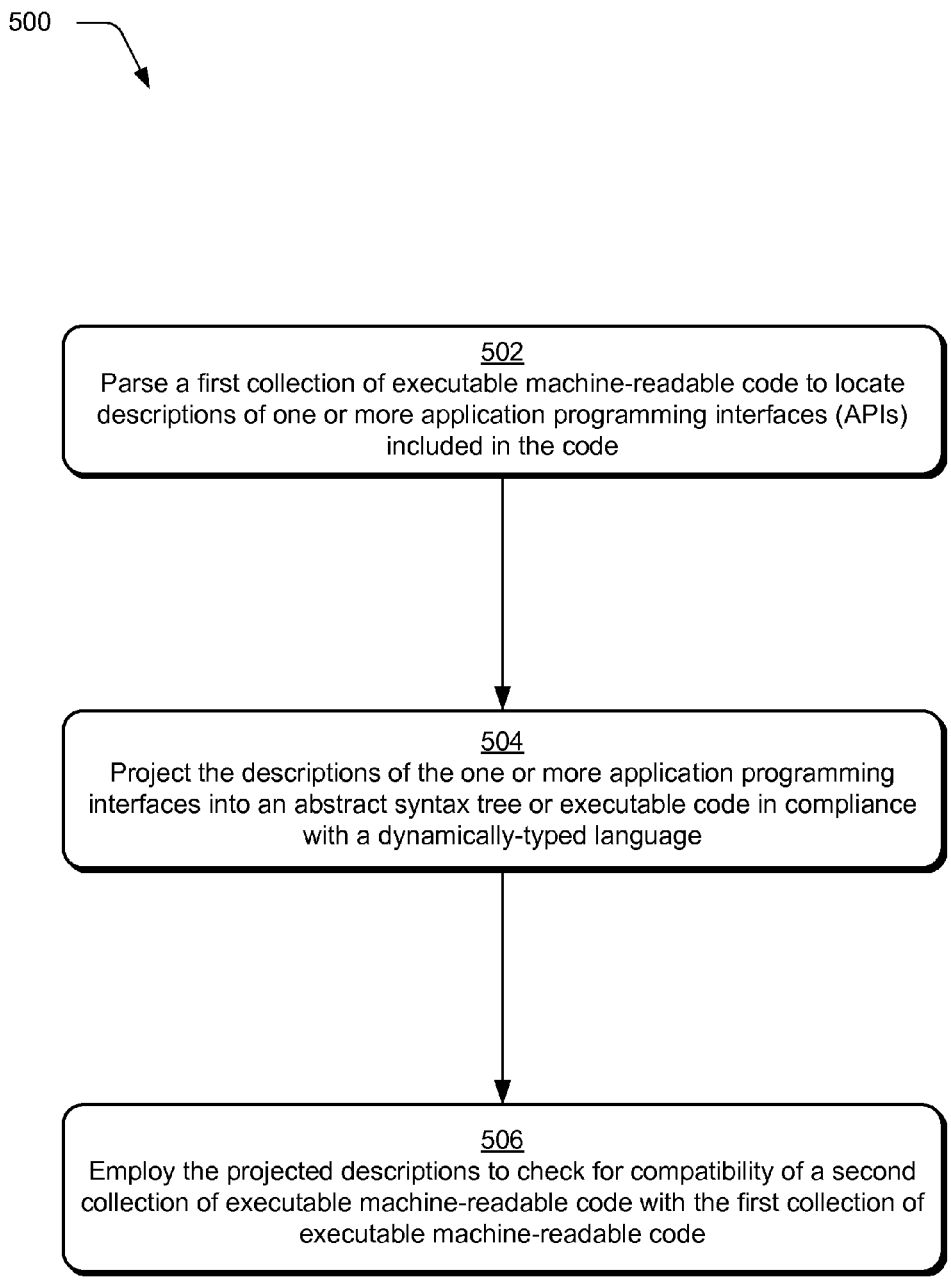
FIG. 5 is a flow diagram depicting a procedure in an example implementation in which compatibility is checked using projected descriptions of one or more application programming interfaces.

FIG. 5 depicts a procedure 500 in an example implementation in which compatibility is checked using projected descriptions of one or more application programming interfaces. A first collection of executable machine-readable code is parsed to locate descriptions of one or more application programming interfaces (APIs) included in the code (block 502). The first collection of executable code, for instance, may be configured as an operating system, a browser, an application, and so on. Further, this parsing may be performed statically without executing the first collection or dynamically during runtime.

The descriptions of the one or more application programming interfaces are projected into an abstract syntax tree or executable code in compliance with a dynamically-typed language (block 504). In this way, the descriptions are consumable by tools, editors, and so on.

The projected descriptions are then employed to check for compatibility of a second collection of executable machine-readable code with the first collection of the executable machine-readable code (block 506). Continuing with the previous example, static and/or dynamic consumption techniques may be employed to determine whether code that is being written and/or had been written is compatible with the first collection. A dynamically-typed language executable code that is to be included in a webpage, for instance, may be checked for compatibility with a browser, such as to check API name availability, call site usage, and so forth. A variety of other examples are also contemplated, such as to check compatibility with an operating system, particular versions of software, and so on.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising:
   one or more processors; and
   one or more memory devices comprising program instructions that when executed by the one or more processors cause the system to enable:
   a parsing module configured to parse a statically-typed code to locate one or more application programming interfaces (APIs);
   a projection module configured to project the application programming interfaces into one or more application programming interface projections; and
   a consumption module configured to locate call sites of a dynamically-typed code and verify that the call sites map to the application programming interface projections from the statically-typed code.

2. A system as described in claim 1, wherein the consumption module is further configured to check for:
   syntax of the dynamically-typed code using the application programming interface projections;
   semantic use of the dynamically-typed code; or
   satisfaction of one or more contracts that is defined by an external code; or
   checking a callback into an implementation of another external code including existence of signatures involved for the callback.

3. A system as described in claim 1, wherein the consumption module verifies the call sites during a runtime of the statically-typed code.

4. A system as described in claim 1, wherein the application programming interface projections are dynamically-typed.

5. A system as described in claim 1, wherein the application programming interface projections comprise abstract syntax trees.

6. A system as described in claim 1, wherein the statically-typed code is a browser and the projection module is further configured to create one or more implicit document object models (DOM).

7. A system as described in claim 1, wherein the consumption module verifies the call sites without executing the statically-typed code.

8. A system as described in claim 1, wherein the statically-typed code is an operating system.

9. A computing device comprising one or more processors and one or more memory devices comprising program instructions that when executed by the one or more processors cause the computing device to perform operations comprising:
   parsing a first collection of statically-typed executable machine-readable code to locate descriptions of one or more application programming interfaces (APIs) included in the first collection of statically-typed executable machine-readable code;
   transforming the descriptions of the one or more application programming interfaces of the first collection of statically-typed executable machine-readable code into an alternate form; and
   checking compatibility of a second collection of dynamically-typed executable machine-readable code with the first collection of statically-typed executable machine-readable code using the transformed descriptions of the one or more application programming interfaces of the first collection of statically-typed executable machine-readable code to verify that call sites of the second collection of dynamically-type executable machine-readable code map to the alternate form.

10. A computing device as described in claim 9, wherein the checking compatibility of the second collection of dynamically-typed executable machine-readable code comprises consuming the transformed descriptions of the one or more application programming interfaces of the first collection of statically-typed executable machine-readable code by the second collection of dynamically-typed executable machine-readable code.

11. A computing device as described in claim 10, wherein transforming the descriptions of the one or more application programming interfaces of the first collection of statically-typed executable machine-readable code comprises converting the one or more application programming interfaces of the first collection of statically-typed executable machine-readable code into facades effective to enable the second collection of dynamically-typed executable machine-readable code to consume the transformed descriptions of the one or more application programming interfaces of the first collection of statically-typed executable machine-readable code.

12. A computing device as described in claim 9, wherein the checking compatibility of the second collection of dynamically-typed executable machine-readable code comprises utilizing a code editor and static checker to check the second collection of dynamically-typed executable machine-readable code for calls to one or more non-existent application programming interfaces within the first collection of statically-typed executable machine-readable code.

13. A computing device as described in claim 9, wherein the parsing the first collection of statically-typed executable machine-readable code involves searching the first collection of statically-typed executable machine-readable code for data which indicates an application programming interface.

14. A computing device as described in claim 9, wherein the transforming the descriptions of the one or more application programming interfaces of the first collection of statically-typed executable machine-readable code comprises a direct transliteration of one or more of the application programming interfaces of the first collection of statically-typed executable code to reflect runtime callable conditions of the first collection of statically-typed executable code.

15. A computing device as described in claim 9, wherein the transforming the descriptions of the one or more application programming interfaces of the first collection of statically-typed executable machine-readable code comprises inserting annotations of code hints into the transformed descriptions of the one or more application programming interfaces of the first collection of statically-typed executable machine-readable code in order to provide indirect information to the second collection of dynamically-typed executable machine-readable code.

16. A computing device as described in claim 9, wherein the transformed descriptions of the one or more application programming interfaces of the first collection of statically-typed executable machine-readable code may be leveraged by a variety to different executable modules.

17. A computing device as described in claim 9, wherein the checking compatibility of the second collection of dynamically-typed executable machine-readable code comprises examining metadata that describes the one or more one or more application programming interfaces of the first collection of statically-typed executable machine-readable code and executable machine readable code that implements the one or more application programming interfaces of the first collection of statically-typed executable machine-readable code.

18. A system comprising:
   one or more processors; and
   one or more memory devices comprising program instructions that when executed by the one or more processors cause the system to
      enable an application programming interface processing module to employ projected descriptions of one or more application programming interfaces parsed from a collection of statically-typed code and verify that call sites from a collection of dynamically-typed code maps to the projected descriptions from the collection of statically-typed code.

19. A system as described in claim 18, wherein the projected descriptions of the application programming interfaces are in a dynamically-typed language.

20. A system as described in claim 18, wherein the verification that the collection of dynamically-typed code is compatible with the collection of statically-typed code is performed during a runtime of the statically-typed code.

* * * * *